Figure 7:
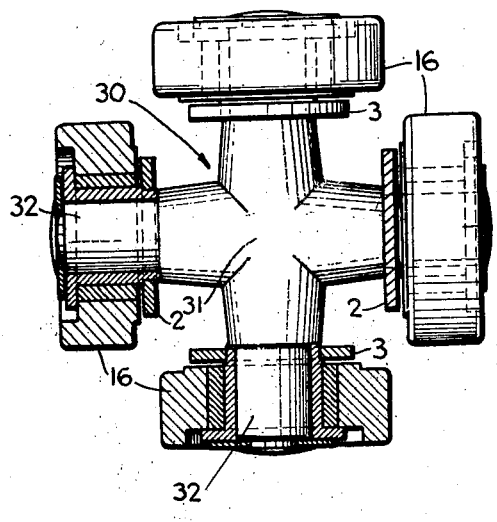

Oct. 17, 1950     C. P. KEEN     2,526,563
CONVEYER CHAIN
Filed April 9, 1946     5 Sheets-Sheet 1
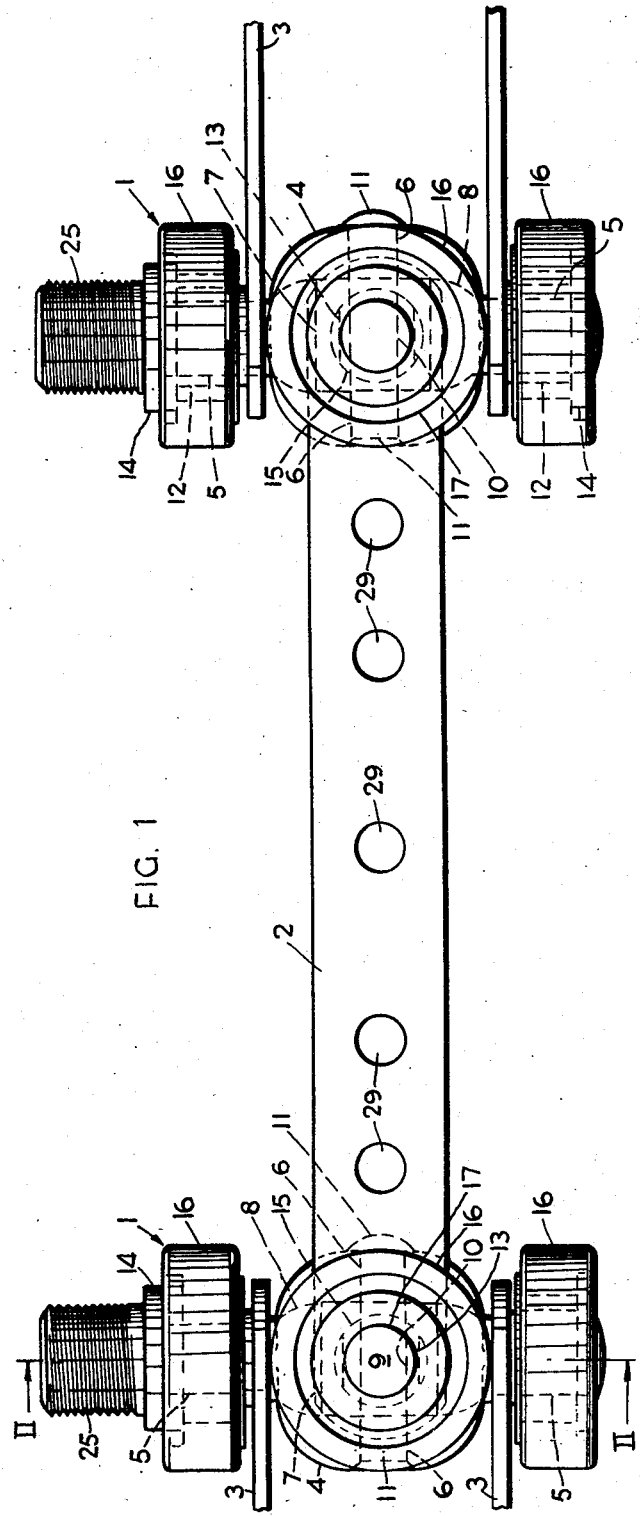
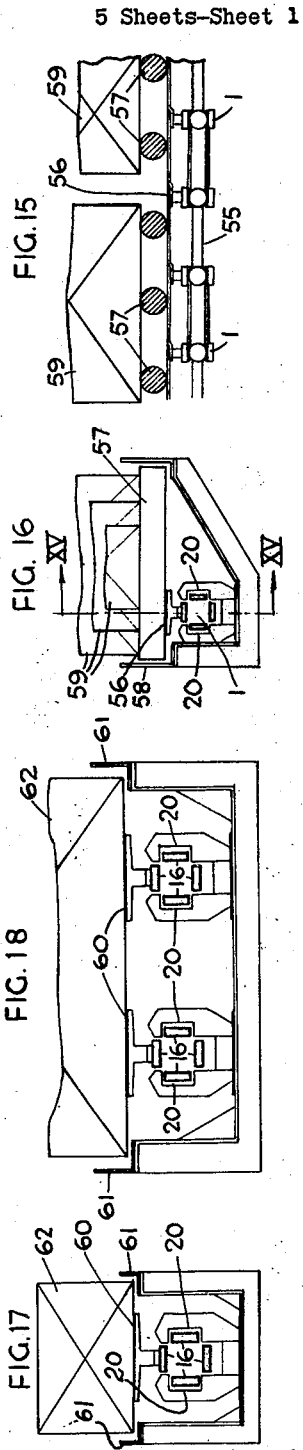
INVENTOR
CHARLES PEARSON KEEN
BY Pech & Pech
ATTORNEY Oct. 17, 1950 C. P. KEEN 2,526,563
CONVEYER CHAIN
Filed April 9, 1946 5 Sheets-Sheet 2

INVENTOR
Charles Pearson Keen
ATTORNEY Peck & Peck

Oct. 17, 1950  C. P. KEEN  2,526,563
CONVEYER CHAIN
Filed April 9, 1946  5 Sheets-Sheet 3

INVENTOR
CHARLES PEARSON KEEN
BY Pech & Pech
ATTORNEY

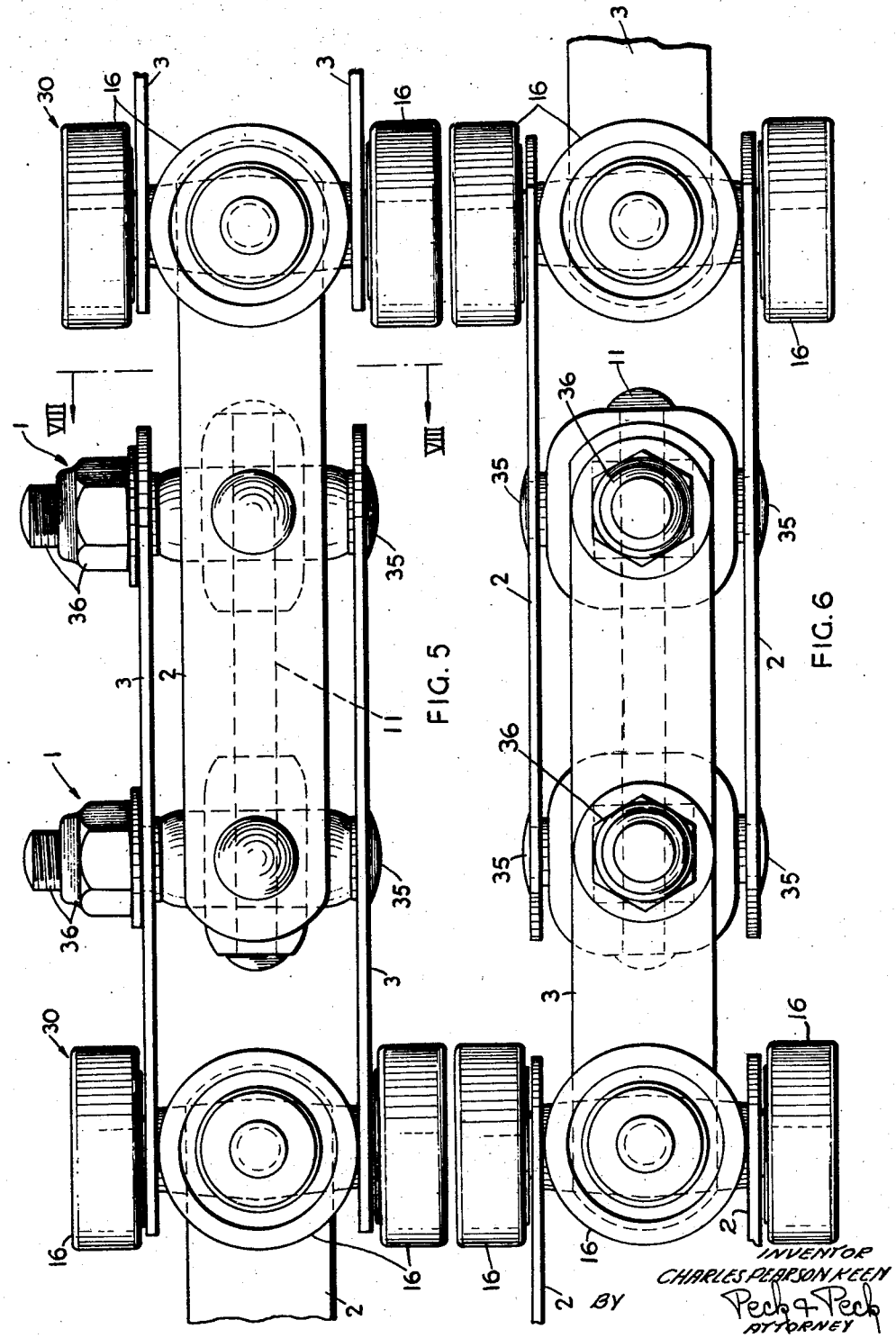

Oct. 17, 1950
C. P. KEEN
2,526,563
CONVEYER CHAIN
Filed April 9, 1946
5 Sheets-Sheet 5
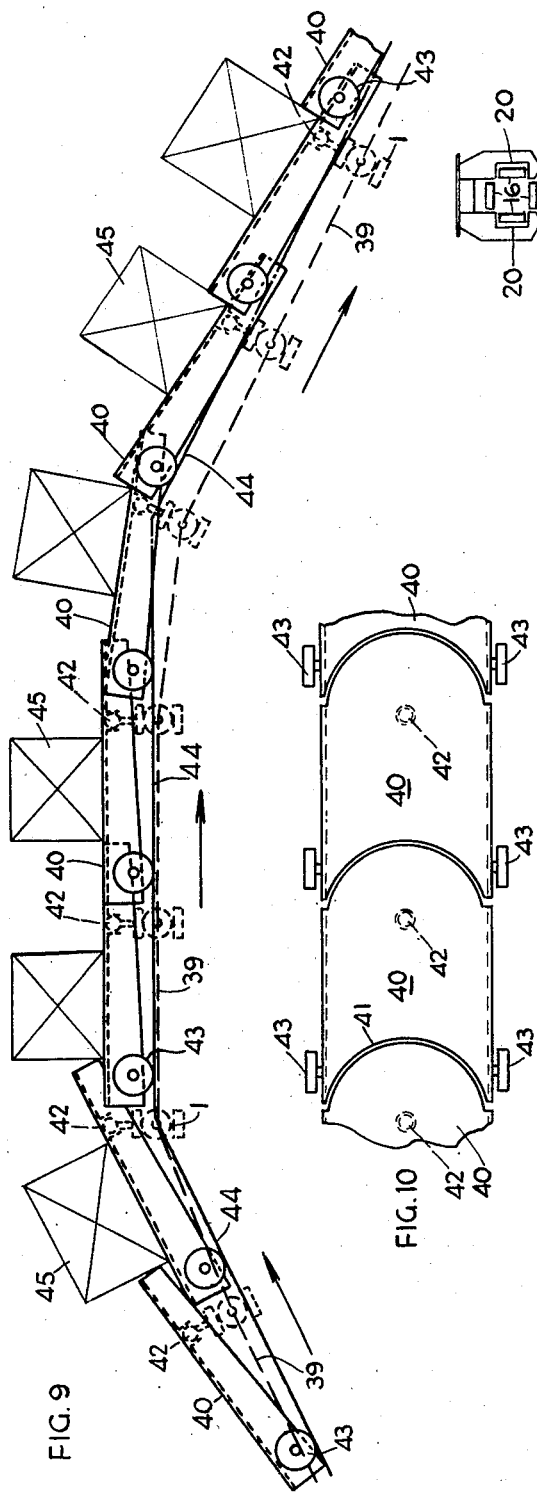
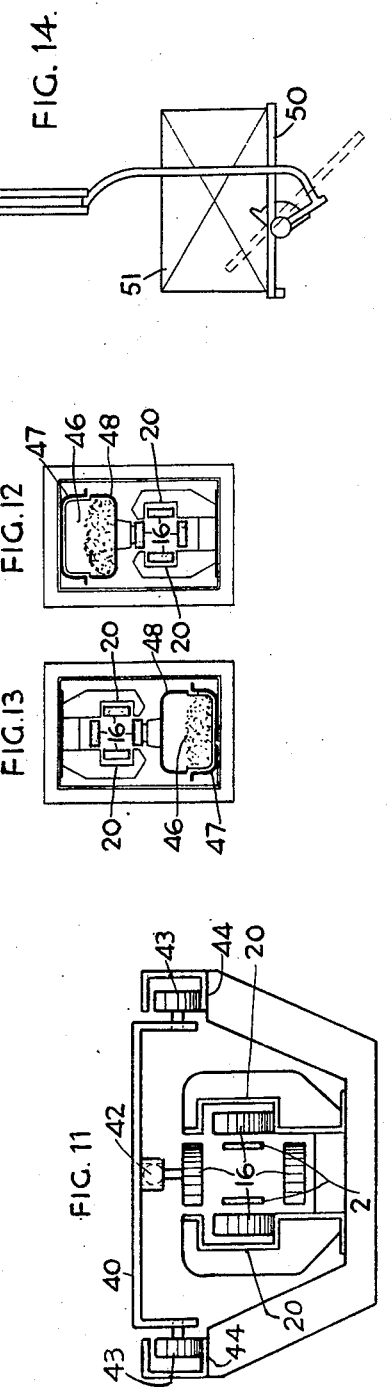
INVENTOR
CHARLES PEARSON KEEN
BY
Peck & Peck
ATTORNEY Patented Oct. 17, 1950

2,526,563

UNITED STATES PATENT OFFICE 2,526,563

CONVEYER CHAIN

Charles Pearson Keen, Matfield, England; William Charles Pearson Keen, administrator of said Charles Pearson Keen, deceased, assignor to Teleflex Products Limited, London, England, a British company Application April 9, 1946, Serial No. 660,830
In Great Britain May 14, 1945

3 Claims. (Cl. 198—189)

This invention relates to conveyor chains such as are employed for mechanically handling or conveying goods and materials of very varied classes and kinds, usually with the aid of ancillary means including attachments to the chain itself and guideways, troughs and other devices associated with the chain or its attachments.

It is the chief object of this invention to provide an improved conveyor chain which, while being of relatively simple construction, shall be more or less universally applicable and shall lend itself to many applications where improved conveyance will be rendered possible as compared with the use of any existing forms of conveyor chains. It is also an object to provide improved conveyors embodying such a chain which are adaptable to any desired path of conveyance of the goods and materials to be handled.

According to the main feature of this invention a conveyor chain comprises pairs of links interconnected by articulating means each of which provides two transverse pivotal axes intersecting at right-angles on the centre line of the chain, one pair of the links being arranged to swing about the one pivotal axis and another pair being arranged to swing about the other pivotal axis, and wheels or rollers mounted on the articulating means to rotate about each of the said pivotal axes.

A further feature of the invention is a chain according to the preceding paragraph wherein articulating means is used which is constructed to permit the transverse pivotal axes to move angularly relatively to each other about the centre line of the chain.

The invention also comprises a conveyor having a chain constructed in accordance with either of the two immediately preceding paragraphs in combination with a guideway providing a channel of cruciform shape in transverse section through which the chain is threaded so that the wheels or rollers on the respective sets of transverse pivotal axes engage in the respective pairs of opposed arms of the channel.

Figure 8:
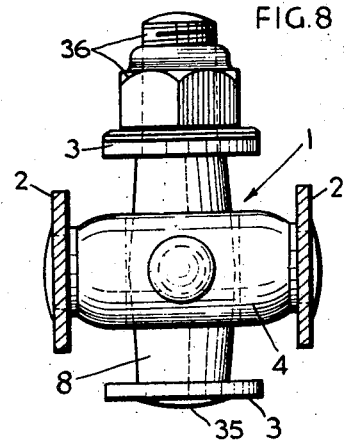
Figure 2:
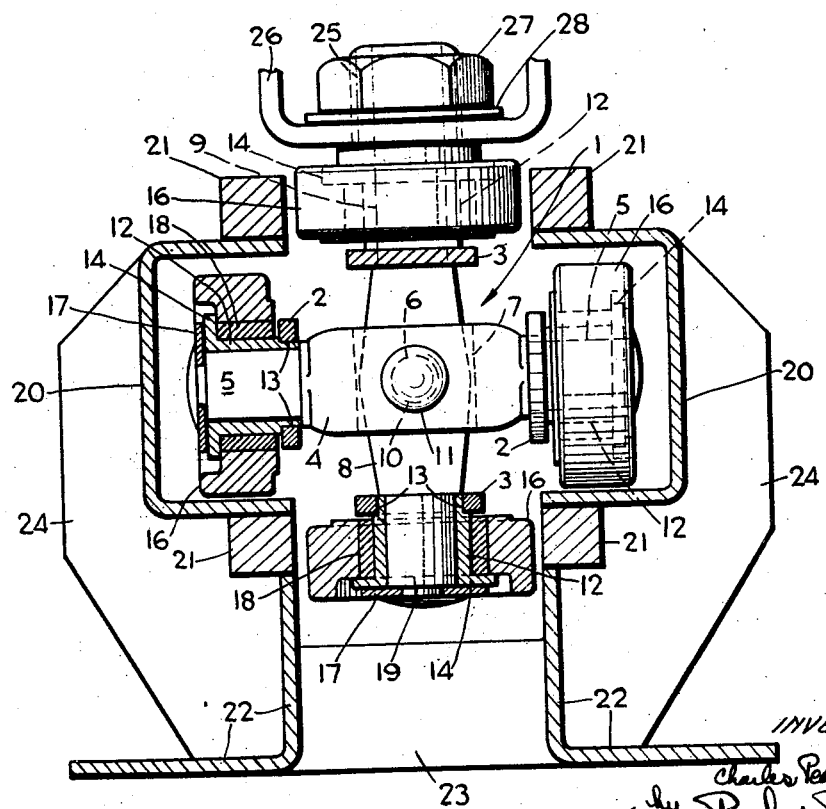
Figure 4:
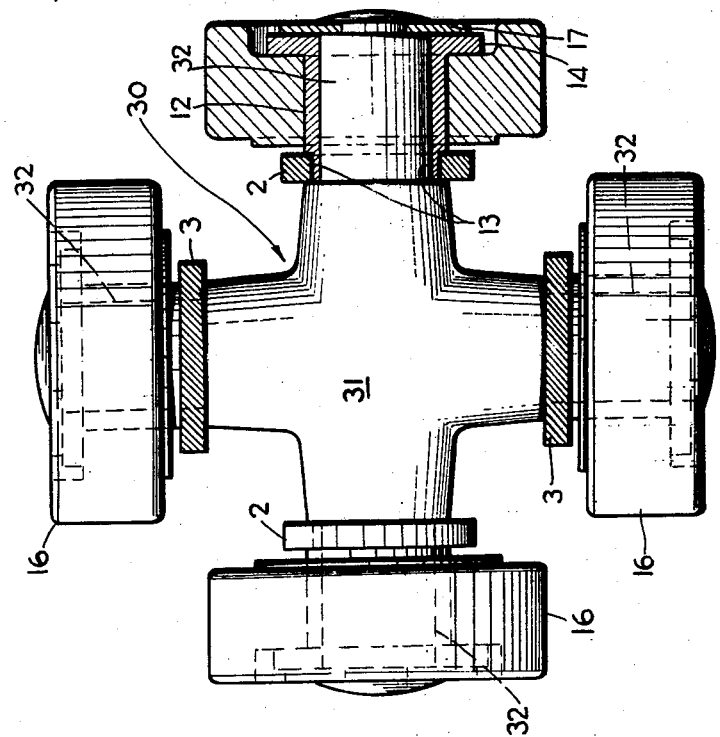
Figure 3:
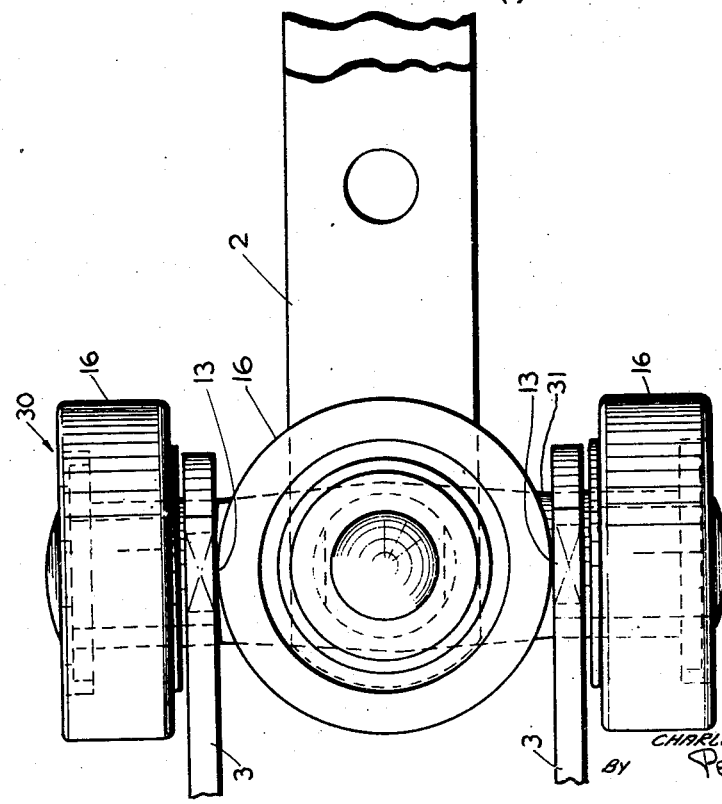

In order that the nature of the invention may be clearly understood, examples of a conveyor chain constructed in accordance therewith and some examples of conveyors embodying the same will now be more fully described with reference to the accompanying drawings, in which:

Figure 1 is a fragmentary elevation illustrating one example of the improved conveyor chain, Figure 2 is an end view of Figure 1 but with parts shown in section on the line II—II of Figure 1, and with a guideway also included, Figure 3 is a fragmentary elevation of another example of the improved conveyor chain, Figure 4 is an end view of Figure 3, Figure 5 is a fragmentary elevation of another example of the conveyor chain, Figure 6 is a plan of Figure 5, Figure 7 is an end elevation of Figure 5, Figure 8 is a sectional elevation on the line VIII—VIII of Figure 5, Figure 9 is an elevation of a conveyor comprising a conveyor chain of the nature referred to, Figure 10 is a partial plan of Figure 9, Figure 11 is a cross-section of Figure 9 to a larger scale, Figures 12 and 13 are cross-sectional views illustrating another conveyor, Figure 14 is a similar view of a further conveyor, Figure 15 is a sectional elevation of another conveyor, the section being on the line XV—XV of Figure 16, Figure 16 is a transverse section of Figure 15, Figure 17 is a transverse section of yet another conveyor, and Figure 18 is a similar view of a further conveyor.

The conveyor chain shown in Figures 1 and 2 comprises a number of articulating means 1 joined by pairs of links 2, 3 arranged as shown. Each of the articulating means 1 comprises a yoke member 4 having a central part in the form of a substantially square frame which is flanked centrally at two opposite sides by trunnion-like parts 5 and is bored through the remaining opposed sides, centrally of their length, to provide aligned apertures 6 leading into the square opening 7 through the frame. Each articulating means 1 also comprises a rocker member 8 having a central enlarged part of rectangular section which is flanked at its ends by aligned trunnion-like parts 9 and is bored through transversely centrally of its length with a hole 10. The enlarged part of the rocker member is of a thickness to fit freely in the square opening 7 of the frame part of the yoke member 4, with the transverse bore 10 therein aligned with the apertures 6 bored in the frame sides, and has two opposed side faces inclined inwards somewhat towards each other from the middle to each end as will be seen from Figure 2. A pin or rivet 11 is secured at its ends in the apertures 6 in the frame sides to connect the yoke and rocker members 4, 8 pivotally in the form of a cross, the inclined side faces of the rocker member allowing the latter to swing about the pin or rivet 11, through a limited angle, relative to the yoke member 4.

The articulating means 1 thus constituted presents four trunnion-like parts 5, 5, 9, 9, and each of these is fitted with a rotatable cylindrical bush 12 having two opposed flats 13 near its inner end and a flanged outer end 14. Engaged with the flats 13 of each bush is one end of a chain link 2 or 3 respectively having a correspondingly shaped aperture 15, Figure 1, and rotatably mounted on the main part of the bush is a wheel 16 of a diameter approximating in length the length of the enlarged part of the rocker member 8 or frame part of the yoke member 4. The wheel 16 is retained on its bush 12 by the flange 14 and the adjacent link 2 or 3, and the bush itself is retained on its trunnion-like part 5 or 9 by a collar or washer 17 secured on the outer end thereof as by riveting over the end of the part 5 or 9 in the manner shown. The wheel may be provided with a self-oiling or oil-impregnated bushing 18 or may run on an anti-friction bearing of the ball, roller or needle type.

It will now be understood that the conveyor chain thus constituted may be caused to travel without difficulty in any tortuous, helical or other path involving changes in direction in several different planes, the articulating means 1 providing freedom of angular movement between successive links in the chain about three axes at right angles to each other.

The guideway shown in Figure 2 is one form suitable for determining the path of travel of the conveyor chain. It is of cruciform shape in transverse section and comprises a pair of opposed channel members 20 having their flanges directed towards each other with their longitudinal edges spaced apart by slightly more than the diameter of a wheel 16 on the chain and their webs of a width slightly more than this spacing. On the outer faces of the flanges, along their longitudinal edges, are secured or formed track or rail members 21 which come opposite the wheels 16 on the pair of opposed trunnion-like parts 9 of an articulating means when the wheels 16 on the other pair of trunnion-like parts 5 thereof are located within the opposed channel members 20, the inner faces of the flanges of these members constituting tracks for the latter wheels.

The channel members 20 may be mounted as desired. For example, they may each be secured, through the adjacent strip 21, to the edge of an angle section member 22, these members having their opposed parallel flanges connected at intervals by transverse webs, such as 23, while their outwardly directed other flanges are adapted for attachment to a floor, wall, ceiling or other supporting structure. Stiffening webs 24 may be provided at intervals to connect each channel 20 to its associated angle 22 externally of the guideway.

The conveyor chain and guideway thus described may be employed in the construction of various types of conveyors. In order to render them adaptable, the rocker members 8 and/or the yoke members 4 of the articulating means 1 are preferably provided with a short screw-threaded spigot-like extension at one or both ends, beyond the means retaining the bushes on their trunnion-like parts 5, 9. Such an extension may be from the trunnion-like parts aforesaid but is shown by way of illustration at 25, at one end of the rocker members 8, as extending from the flange 14 of the bush 12 of the adjacent trunnion-like part 9, the latter being lengthened to allow the bush to be retained thereon. The said extensions, such as 25, may be employed for securing ancillary attachments to the chains in order to produce the desired form of conveyor. Part of such an attachment is indicated at 26 in Figure 2 secured on the extension by a nut 27 and washer 28. Alternatively or additionally, the chain links 2, 3 may each be formed with a plurality of apertures, such as 29, spaced apart along their length, for a similar purpose.

According to the example shown in Figures 3 and 4, the articulating means 30 comprises a four-armed cross-like member 31 having similar trunnion-like parts 32 at the ends of the arms to take wheels 16. The links are shown of like nature to the aforesaid links 2, 3 and these and other parts which are similar to those included in Figures 1 and 2 are similarly numbered. This form of conveyor chain is suitable for articulation in two planes only about the axes of the respective pairs of trunnion-like parts 32.

The example of conveyor chain shown in Figures 5 to 8 is suitable for articulation in planes at right-angles to each other and also for torsional articulation, similarly to the construction described with reference to Figures 1 and 2. It differs from the latter construction, however, in employing a combination of articulating means similar (with modification hereinafter indicated) to that marked 1 in Figures 1 and 2 with articulating means like that denoted 30 in Figures 3 and 4. The several articulating means are marked 1 and 30 in Figures 5 to 8 wherein it will be seen that the chain links 2, 3 considerably overlap at one end where they have connection with a pair of the articulating means 1 while at the other end the links have connection with an articulating means 30. Other parts which are similar to those shown in the previous figures are similarly numbered in Figures 5 to 8. The articulating means 30 take care of the articulation in the planes at right-angles to each other while the pairs of articulating means 1 allow of articulation in a third plane. Conceivably, one of each pair of the articulating means 1 could be omitted so that the links would be connected up therewith as shown in Figures 1 and 2, but the use of them in pairs with corresponding overlapping of the links, as in Figures 5 to 8, more aptly provides for, and gives a better control of, the torsional articulation. There may be a single pin or rivet 11 for the pairs 1 of the necessary increased length to extend between a pair as shown in Figures 5 and 6. Moreover, as the pairs 1 are required to take care only of torsional articulation, the trunnion-like parts 5, 9 of Figures 1 and 2 are not used, the members 8 being connected at each end to the links as by riveting at 35 or bolting at 36. Bolting might be used when fittings are to be secured to the conveyor chain, the bolting serving to connect such fittings to the chain.

Various fittings, of course, may be applied to the conveyor chains in any of the manners above described or in other appropriate fashion as will be understood.

Examples of the many and varied uses to which the conveyor chains may be put may be briefly indicated as follows:

As depicted in Figures 9 to 11 wherein the conveyor chain is shown only diagrammatically at 39, each articulating means, such as 1 (Figures 1 and 2), may be connected to a platform 40 (with upturned or as shown downturned longitudinal edges if required), which mates, by joints 41 permitting the necessary angular movements, to the next adjacent platforms 40. The platforms may be connected with the articulating means 1 by disengageable ball and socket joints 42, each ball being carried for example by an attachment such as 26 shown in Figure 2. The platforms are supported by the ball and socket joints 42 and by wheels 43 which run on tracks 44. By appropriate laying of the track, the platforms can be stepped with respect to one another on inclined sections of a conveyor, as shown in Figure 9, so that objects such as 45 will be retained, properly spaced from each other, on the respective platforms. On level sections of the tracks 44, the platforms are co-planar and so would allow the objects 45 to be deflected off or on to the conveyor at these places. The arrows indicate the direction of travel of the conveyor. In some cases, the platforms may be mounted directly on the screw-threaded extensions 25 from the articulating means 1 to produce a similar type of conveyor and similar remarks apply to other conveyors herein described.

According to Figure 12 trough-like platforms 48, which are hinged together at the ends to form a continuous trough and are provided with transverse upstanding partitions 46 running in an inverted trough 47, are carried on the conveyor chain and employed to convey bulk material which normally is supported on the platforms. At a discharge point, however, the arrangement becomes inverted as shown in Figure 13 so that the material is moved along the trough 47 by the partitions 46 on the chain-supported platforms 48 and is thus brought to delivery openings (not shown) in the trough 47 that may be fitted with sliding doors.

In the conveyor illustrated in Figure 14, platforms 50 are suspended pendulum-wise from the conveyor chain at intervals to support packages such as 51 for transport. As shown by dotted lines the platforms may be tiltable for discharging the packages.

In Figures 15 and 16, the conveyor chain, marked 55, carries a continuous but suitably articulated member 56 adapted to run in contact with the underside of rollers 57, mounted in rails 58 in fixed positions, in order to drive the rollers so that packages, such as 59, supported thereon will be advanced accordingly. If desired, the member 56 could be disposed centrally between the rails 58 instead of to one side as shown in Figure 16.

Figure 17 illustrates a conveyor comprising spaced slats 60 carried by the conveyor chain and operating in conjunction with guide-ways 61 for conveyance of packages 62 which have little or no variation in width and are approximately as wide as the distance between the guide-ways 61. The conveyor shown by Figure 18 is similar but, in order to accommodate the conveyance of larger packages 62, two conveyor chains are used each carrying spaced slats 60, and the guideways 61 are correspondingly wider apart. Lugs could be attached to the slats to prevent the packages from sliding on inclines, and similar provision could be provided in other conveyors of the invention where appropriate.

What I claim is:

1. A conveyor chain comprising pairs of links interconnected by articulating means each comprising a yoke member having a central frame part, trunnion-like parts at two opposite sides, aligned apertures through the remaining opposed sides, a rocker member bored through centrally and inserted in the frame part, a pin disposed in the bore of the rocker and the aligned apertures of the yoke to connect the rocker and the yoke, trunnion-like parts on the ends of the rocker member, and a wheel or roller mounted on each trunnion-like part, one pair of links being connected to the trunnion-like parts at opposite sides of the frame part and the other pair of links being connected to the trunnion-like parts on the end of the rocker.

2. A conveyor chain comprising articulating means comprising a four-armed rigid cross-like member, a trunnion-like part at the end of each arm and a wheel or roller at the end of each trunnion-like part, a second articulating means comprising a yoke member having a central frame part, aligned apertures through two opposed sides of the yoke, a rocker member bored through centrally and inserted in the frame part, and a pin disposed in the bore of the rocker and the aligned apertures of the yoke to connect the rocker and the yoke, a first link of a pair of links connected at one end to an arm of the cross-like member and at the other end to a non-apertured side of the frame part of the second articulating means, a second link of the said pair connected at one end to an opposite arm of the cross-like member and at the other end to the opposite non-apertured side of the frame part of the second articulating means and another pair of links connected at one end to the ends of the rocker and at the other end to opposite arms of another cross-like member.

3. A conveyor chain as set forth in claim 2 wherein the pairs of links are connected to an additional articulating means comprising a yoke member having a central frame part, aligned apertures through two opposed sides, a rocker member bored through centrally and inserted in the frame part, and a pin disposed in the bore of the rocker and the aligned apertures of the yoke to connect the rocker and the yoke.

CHARLES PEARSON KEEN.

REFERENCES CITED

The following references are of record in the file of this patent:

UNITED STATES PATENTS

| Number | Name | Date |
| --- | --- | --- |
| 1,000,107 | Morris | Aug. 9, 1911 |
| 2,187,498 | Landahl | Jan. 16, 1940 |
| 2,319,617 | Manierre | May 18, 1943 |
| 2,372,199 | Hassler | Mar. 27, 1945 |

FOREIGN PATENTS

| Number | Country | Date |
| --- | --- | --- |
| 201,584 | Great Britain | Aug. 1, 1923 |
| 440,796 | Germany | Feb. 16, 1927 |